United States Patent [19]
Hendel et al.

[11] Patent Number: 6,115,378
[45] Date of Patent: Sep. 5, 2000

[54] MULTI-LAYER DISTRIBUTED NETWORK ELEMENT

[75] Inventors: Ariel Hendel, Cupertino; Shimon Muller, Sunnyvale, both of Calif.

[73] Assignee: Sun Microsystems, Inc., Mountain View, Calif.

[21] Appl. No.: 08/884,919

[22] Filed: Jun. 30, 1997

[51] Int. Cl.[7] .............................. H04J 3/02; H04L 12/02
[52] U.S. Cl. .......................................... 370/392; 370/400
[58] Field of Search .................................. 370/400, 401, 370/402, 403, 404, 405, 389, 392, 351, 410, 466, 467, 469, 409; 395/200.68, 200.72, 200.73, 200.74, 200.79, 200.8, 200.5

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/402 |
| 4,641,302 | 2/1987 | Miller | 370/60 |
| 4,737,953 | 4/1988 | Koch et al. | 370/401 |
| 5,130,977 | 7/1992 | May et al. | 370/60 |
| 5,159,685 | 10/1992 | Kung | 395/575 |
| 5,163,046 | 11/1992 | Hahne et al. | 370/79 |
| 5,309,437 | 5/1994 | Perlman et al. | 340/827 |
| 5,365,514 | 11/1994 | Hershey et al. | 370/17 |
| 5,402,415 | 3/1995 | Turner | 370/60 |
| 5,420,862 | 5/1995 | Perlman . | |
| 5,425,026 | 6/1995 | Mori | 370/60 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.51 |
| 5,517,488 | 5/1996 | Miyazaki et al. | 370/16 |
| 5,550,816 | 8/1996 | Hardwick et al. | 370/60 |
| 5,553,067 | 9/1996 | Walker et al. | 370/60 |
| 5,557,610 | 9/1996 | Calamvokis et al. | 370/60.1 |
| 5,563,878 | 10/1996 | Blakeley et al. | 370/60 |
| 5,566,170 | 10/1996 | Bakke et al. | 370/60 |
| 5,574,861 | 11/1996 | Lorvig et al. | 395/200.06 |

(List continued on next page.)

OTHER PUBLICATIONS

International Search Report, PCT/US 98/13203.
Microsoft Press, "Microsoft Computer Dictionary Fourth Edition", Microsoft Corporation, 1999, 4 pages.
International Standard ISO/IEC 10038, ANSI/IEEE Std 802.1D, First Edition, 1993.
"Load Balancing for Multiple Interfaces for Transmission Control Protocol/Internet Protocol for VM/MVS", IBM Technical Disclosure Bulletin, 38(9): 7–9 (Sep., 1995).
T. Nishizono et al., "Analysis on a Multilink Packet Transmission System", Electron. Commun. JPN 1, Commun., (USA), 68(9): 98–104 (Sep., 1985).
International Search Report, PCT/US 98/13380.
"IP On Speed", Erica Roberts, Internet–Draft, Data Communications on the Web, Mar. 1997, 12 pages.
"Multilayer Topology", White Paper, Internet–Draft, 13 pages, downloaded from website http://wwwbaynetworks.com on Apr. 18, 1997.

(List continued on next page.)

*Primary Examiner*—Huy D. Vu
*Attorney, Agent, or Firm*—Blakely Sokoloff Taylor & Zafman

[57] ABSTRACT

A distributed multi-layer network element delivering Layer 2 (data link layer) wire-speed performance within and across subnetworks, allowing queuing decisions to be based on Layer 3 (network layer) protocol and endstation information combined with Layer 2 topology information. The network element performs packet relay functions using multiple switching subsystems as building blocks coupled to each other to form a larger switch that acts as both a router and a bridge. Each switching subsystem includes a hardware forwarding search engine having a switching element coupled to a forwarding memory and an associated memory. The switching subsystems and their fully meshed interconnection allow the network element to scale easily without compromising packet forwarding speed and without significantly increasing the storage requirements of each forwarding memory.

25 Claims, 4 Drawing Sheets

U.S. PATENT DOCUMENTS

| | | | |
|---|---|---|---|
| 5,615,340 | 3/1997 | Dai et al. | 395/200.17 |
| 5,619,497 | 4/1997 | Gallagher et al. | 370/394 |
| 5,623,489 | 4/1997 | Cotton et al. | 370/381 |
| 5,633,710 | 5/1997 | Mandal et al. | 364/514 |
| 5,689,506 | 11/1997 | Chiussi et al. | 370/388 |
| 5,689,518 | 11/1997 | Galand et al. | 371/37.1 |
| 5,724,348 | 3/1998 | Basso et al. | 370/384 |
| 5,734,651 | 3/1998 | Blakeley et al. | 370/392 |
| 5,748,631 | 5/1998 | Bergantino et al. | 370/398 |
| 5,751,971 | 5/1998 | Dobbins et al. | 395/200.68 |
| 5,754,774 | 5/1998 | Bittinger et al. | 395/200.33 |
| 5,784,559 | 7/1998 | Frazier et al. | 395/200.13 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/409 |
| 5,825,767 | 10/1998 | Mizukoshi et al. | 370/395 |
| 5,825,772 | 10/1998 | Dobbins et al. | 370/396 |
| 5,835,491 | 11/1998 | Davis et al. | 370/386 |
| 5,838,677 | 11/1998 | Kozaki et al. | 370/389 |
| 5,838,681 | 11/1998 | Bonomi et al. | 370/395 |
| 5,852,607 | 12/1998 | Chin | 370/401 |
| 5,856,977 | 1/1999 | Yang et al. | 370/411 |
| 5,859,849 | 1/1999 | Parks | 370/395 |
| 5,867,677 | 2/1999 | Tsukamoto | 395/311 |
| 5,872,783 | 2/1999 | Chin | 370/392 |
| 5,872,904 | 2/1999 | McMillen et al. | 395/182.02 |
| 5,875,464 | 2/1999 | Kirk | 711/129 |
| 5,878,043 | 3/1999 | Casey | 370/397 |
| 5,878,232 | 3/1999 | Marimuthu | 395/200.79 |
| 5,892,912 | 4/1999 | Suzuki et al. | 395/200.48 |
| 5,898,687 | 4/1999 | Harriman et al. | 370/390 |
| 5,931,980 | 8/1999 | Varma et al. | 370/395 |

OTHER PUBLICATIONS

"Foundry Products", downloaded from Website http://www.foundrynet.com/ on Jun. 19, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997 40 pages.

MULTI-LAYER DISTRIBUTED NETWORK ELEMENT

BACKGROUND

1. Field of the Invention

This invention is generally related to communication between computers using a layered architecture and, more specifically, to a system and method for forwarding packets using multi-layer information.

2. Description of the Related Art

Communication between computers has become an important aspect of everyday life in both private and business environments. Computers converse with each other based upon a physical medium for transmitting the messages back and forth, and upon a set of rules implemented by electronic hardware attached to and programs running on the computers. These rules, often called protocols, define the orderly transmission and receipt of messages in a network of connected computers.

A local area network (LAN) is the most basic and simplest network that allows communication between a source computer and destination computer. The LAN can be envisioned as a cloud to which computers (also called end stations or end-nodes) that wish to communicate with one another are attached. At least one network element will connect with all of the end stations in the LAN. An example of a simple network element is the repeater which is a physical layer relay that forwards bits. The repeater may have a number of ports, each end station being attached to one port. The repeater receives bits that may form a packet of data that contains a message from a source end station, and blindly forwards the packet bit-by-bit. The bits are then received by all other end stations in the LAN, including the destination.

A single LAN, however, may be insufficient to meet the requirements of an organization that has many end stations, because of the limited number of physical connections available to and the limited message handling capability of a single repeater. Thus, because of these physical limitations, the repeater-based approach can support only a limited number of end stations over a limited geographical area.

The capability of computer networks, however, has been extended by connecting different subnetworks to form larger networks that contain thousands of endstations communicating with each other. These LANs can in turn be connected to each other to create even larger enterprise networks, including wide area network (WAN) links.

To facilitate communication between subnets in a larger network, more complex electronic hardware and software have been proposed and are currently used in conventional networks. Also, new sets of rules for reliable and orderly communication among those end stations have been defined by various standards based on the principle that the end stations interconnected by suitable network elements define a network hierarchy, where end stations within the same subnet have a common classification. A network is thus said to have a topology which defines the features and hierarchical position of nodes and end stations within the network.

The interconnection of end stations through packet switched networks has traditionally followed a peer-to-peer layered architectural abstract. In such a model, a given layer in a source computer communicates with the same layer of a pier end station (usually the destination) across the network. By attaching a header to the data unit received from a higher layer, a layer provides services to enable the operation of the layer above it. A received packet will typically have several headers that were added to the original payload by the different layers operating at the source.

There are several layer partition schemes in the prior art, such as the Arpanet and the Open Systems Interconnect (OSI) models. The seven layer OSI model used here to describe the invention is a convenient model for mapping the functionality and detailed implementations of other models. Aspects of the Arpanet, however, (now redefined by the Internet Engineering Task Force, or IETF) will also be used in specific implementations of the invention to be discussed below.

The relevant layers for background purposes here are Layer 1 (physical), Layer 2 (data link), and Layer 3 (network), and to a limited extent Layer 4 (transport). A brief summary of the functions associated with these layers follows.

The physical layer transmits unstructured bits of information across a communication link. The repeater is an example of a network element that operates in this layer. The physical layer concerns itself with such issues as the size and shape of connectors, conversion of bits to electrical signals, and bit-level synchronization.

Layer 2 provides for transmission of frames of data and error detection. More importantly, the data link layer as referred to in this invention is typically designed to "bridge," or carry a packet of information across a single hop, i.e., a hop being the journey taken by a packet in going from one node to another. By spending only minimal time processing a received packet before sending the packet to its next destination, the data link layer can forward a packet much faster than the layers above it, which are discussed next. The data link layer provides addressing that may be used to identify a source and a destination between any computers interconnected at or below the data link layer. Examples of Layer 2 bridging protocols include those defined in IEEE 802 such as CSMA/CD, token bus, and token ring (including Fiber Distributed Data Interface, or FDDI).

Similar to Layer 2, Layer 3 also includes the ability to provide addresses of computers that communicate with each other. The network layer, however, also works with topological information about the network hierarchy. The network layer may also be configured to "route" a packet from the source to a destination using the shortest path. Finally, the network layer can control congestion by simply dropping selected packets, which the source might recognize as a request to reduce the packet rate.

Finally, Layer 4, the transport layer, provides an application program such as an electronic mail program with a "port address" which the application can use to interface with Layer 3. A key difference between the transport layer and the lower layers is that a program on the source computer carries a conversation with a similar program on the destination computer, whereas in the lower layers, the protocols are between each computer and its immediate neighbors in the network, where the ultimate source and destination endstations may be separated by a number of intermediate nodes. Examples of Layer 4 and Layer 3 protocols include the Internet suite of protocols such as TCP (Transmission Control Protocol) and IP (Internet Protocol).

Endstations are the ultimate source and destination of a packet, whereas a node refers to an intermediate point between the endstations. A node will typically include a network element which has the capability to receive and forward messages on a packet-by-packet basis.

Generally speaking, the larger and more complex networks typically rely on nodes that have higher layer (Layers 3 and 4) functionalities. A very large network consisting of several smaller subnetworks must typically use a Layer 3 network element known as a router which has knowledge of the topology of the subnetworks.

A router can form and store a topological map of the network around it based upon exchanging information with its neighbors. If a LAN is designed with Layer 3 addressing capability, then routers can be used to forward packets between LANs by taking advantage of the hierarchical routing information available from the endstations. Once a table of endstation addresses and routes has been compiled by the router, packets received by the router can be forwarded after comparing the packet's Layer 3 destination address to an existing and matching entry in the memory.

In comparison to routers, bridges are network elements operating in the data link layer (Layer 2) rather than Layer 3. They have the ability to forward a packet based only on the Layer 2 address of the packet's destination, typically called the medium access control (MAC) address. Generally speaking, bridges do not modify the packets. Bridges forward packets in a flat network having no hierarchy without any cooperation by the endstations.

Hybrid forms of network elements also exist, such as brouters and switches. A brouter is a router which can also perform as a bridge. The term switch refers to a network element which is capable of forwarding packets at high speed with functions implemented in hardwired logic as opposed to a general purpose processor executing instructions. Switches come in many flavors, operating at both Layer 2 and Layer 3.

Having discussed the current technology of networking in general, the limitations of such conventional techniques will now be addressed. With an increasing number of users requiring increased bandwidth from existing networks due to multimedia applications to run on the modern day Internet, modern and future networks must be able to support a very high bandwidth and a large number of users. Furthermore, such networks should be able to support multiple traffic types such as dial voice and video which typically require different bandwidths. Statistical studies show that the network domain, i.e., a group of interconnected LANs, as well as the number of individual endstations connected to each LAN, will grow at a faster rate in the future. Thus, more network bandwidth and more efficient use of resources is needed to meet these requirements.

Building networks using Layer 2 elements such as bridges provides fast packet forwarding between LANs but has no flexibility in traffic isolation, redundant topologies, and end-to-end policies for queuing and access control. For example, although endstations in a subnet can invoke conversations based on either Layer 3 or Layer 2 addressing, the higher layer functionalities are not supported by bridges. As bridges forward packets based on only Layer 2 parsing, they provide simple yet speedy forwarding services. However. the bridge does not support the use of high layer handling directives including queuing, priority, and forwarding constraints between endstations in the same subnet.

A prior art solution to enhancing bridge-like conversations within a subnet relies on a network element that uses a combination of Layer 2 and upper layer headers. In that system, the Layer 3 and Layer 4 information of an initial packet are examined, and a "flow" of packets is predicted and identified using a new Layer 2 entry in the forwarding memory, with a fixed quality of service (QOS). Thereafter, subsequent packets are forwarded at Layer 2 speed (with the fixed QOS) based upon a match of the Layer 2 header with the Layer 2 entry in the forwarding memory. Thus, no entries with Layer 3 and Layer 4 headers are placed in the forwarding memory to identify the flow.

However, consider the scenario where there are two or more programs communicating between the same pair of endstations, such as an electronic mail program and a video conferencing session. If the programs have dissimilar QOS needs, the prior art scheme just presented will not support different QOS characteristics between the same pair of endstations, because the prior art scheme does not consider information in Layer 3 and Layer 4 when forwarding. Thus, there is a need for a network element that is flexible enough to support independent priority requests from applications running on endstations connected to the same subnet.

The latter attributes may be met using Layer 3 elements such as routers. But packet forwarding speed is sacrificed in return for the greater intelligence and decision making capability provided by the router. Therefore, networks are often built using a combination of Layer 2 and Layer 3 elements.

The role of the server has multiplied with browser-based applications that use the Internet, thus leading to increasing variation in traffic distribution. When the role of the server was narrowly limited to a file server, for example, the network was designed with the client and the file server in the same subnet to avoid router bottlenecks. However, more specialized servers like World Wide Web and video servers are typically not on the client's subnet, such that crossing routers is unavoidable. Therefore. the need for packets to traverse routers at higher speeds is crucial. The choice of bridge versus router typically results in a significant trade-off, lower functionality when using bridges, and lower speed when using routers. Furthermore, the service characteristics within a network are no longer homogenous, as the performance of a server becomes location dependent if its traffic patterns involve routers.

Therefore, there is a need for a network element that can handle changing network conditions such as topology and message traffic yet make efficient use of high performance hardware to switch packets based on their Layer 2, Layer 3, and Layer 4 headers. The network element should be able to operate at bridge-like speeds, yet be capable of routing packets across different subnetworks and provide upper layer functionalities such as quality of service.

SUMMARY

The invention lies in a multi-layer distributed network element (MLDNE) system that provides good packet forwarding performance regardless of its location and role in a network. More specifically, the invention uses a distributed architecture to build a larger network element system made up of smaller identical network element subsystems that remain transparent to neighboring network elements and endstations. The multi-layer distributed network element (MLDNE) delivers Layer 2 wire-speed performance within and across subnetworks, while allowing queuing decisions to be based on Layer 3 protocol and topology information, endstation information, and Layer 2 topology information.

The invention's MLDNE includes a plurality of network element subsystems fully meshed and interconnected by internal links. Each network element subsystem includes a hardware search engine included in a switching element coupled to a forwarding memory and an associated data memory. The switching element has a number of internal and external ports, the internal ports coupling the internal links and the external ports coupling a number of connections external to the MLDNE. Packets are received from and forwarded to neighboring nodes and end stations by the MLDNE through the external connections.

The forwarding and associated memories contain entries needed for forwarding the packets. The forwarding memory contains entries having header data obtained from Layer 2 headers of received packets. The forwarding memory also contains Layer 3 and 4 information configured by the CPS of the MLDNE to be matched with the headers of received packets. The associated memory identifies internal and external ports of the switching element that are associated with an entry in the forwarding memory, as well as quality of service (QOS) information. When forwarding, the headers of a received packet are compared to entries in the forwarding memory to find a matching entry, and the associated data of a matching entry is used to pass the packet towards its destination.

The forwarding memory only contains entries given by the following three groups: MAC addresses directly connected to the external connections of the subsystems, Layer 2 bridged "conversations" between an external port of a subsystem and an internal link, and sequences of packets known as flows defined by the MLDNE as a Layer 3/Layer 4 end-to-end conversation (Layer 3 entries). The dominant contribution, however, comes from the MAC addresses that connect with the external connections. Therefore, in the MLDNE architecture, the required depth of the forwarding memory does not multiply with the number of subsystems.

The forwarding memory and associated memory designs attempt to minimize the number of forwarding memory entries that are replicated on more than one network element subsystem. This helps make more efficient use of the memory resources, and minimize the number of places that a forwarding decision is made to yield faster packet relaying. Furthermore, the distributed architecture eliminates the need for one network element subsystem to know about the details of another network element subsystem, including details such as the number of external and internal ports in each switching element, and the specific external port or ports of another switching element through which a packet is to be forwarded outside the MLDNE.

The network element subsystems in MLDNE are fully interconnected and meshed by internal links coupling internal ports in each subsystem. In other words, each subsystem is directly connected to another subsystem via at least one internal link. In this way, a packet forwarded by MLDNE is delayed in no more than two locations, once at the inbound network element subsystem, and at most a second time in the outbound network element subsystem.

With a more centralized approach, increasing the number of external connections would be expected to increase storage requirements in a central high performance forwarding memory. However, in the invention, the header classifications for forwarding the packets are primarily done in the inbound subsystem, the increase in required storage space due to additional subsystems is absorbed by the forwarding memory of each subsystem itself, and there is no need to significantly increase the depth of the other forwarding memories in the other subsystems.

Also, the additional external connections will increase the matching cycle search time in a system having a centralized forwarding memory. With the MLDNE, however, the additional matching cycle searches are only performed by the new subsystem itself.

The MLDNE also contains a central memory (CM) as part of a central processing subsystem (CPS). The CM is under control of and maintained by a central processing unit, and contains a copy of the individual forwarding memories. The communication between the CPS and the various network element subsystems occurs through a bus. The topology of the internal links and the hardware search engines in the various network element subsystems is known to the CPS, so that the CPS can optimally define a path through an internal link for a data packet to travel in order to achieve any desired static load balancing between multiple internal links coupling two network element subsystems.

When forwarding a packet through two subsystems, all forwarding attributes, such as queuing priority, tagging format, routing versus bridging, route and VLAN header replacement, except for the ports in the outbound subsystem, are determined by the header matching cycles of the inbound subsystem. In addition to being storage efficient with respect to the forwarding memory as discussed above, such a scheme can also accommodate a useful model of using Layer 3 and Layer 4 information for queuing, routing, and policy decisions, while using Layer 2 for topology decisions.

Another embodiment of the invention will support flows, where the outbound subsystem has the ability to forward the packet based on Layer 3 queuing, routing and policy information, rather than the relatively rigid Layer 2 forwarding scheme. Because the Layer 3 forwarding capability, including quality of service mapping, of a subsystem is implemented in hardwired logic within each subsystem, forwarding based on a Layer 3 matching cycle should be comparable in speed to forwarding using Layer 2 matching cycles. Such an enhancement comes at the expense of using an additional Layer 3 entry in the outbound subsystem forwarding memory.

BRIEF DESCRIPTION OF THE DRAWINGS

The foregoing aspects and other features of the invention will be better understood by referring to the figures, detailed description, and claims where:

DETAILED DESCRIPTION OF THE INVENTION

Figure 1:
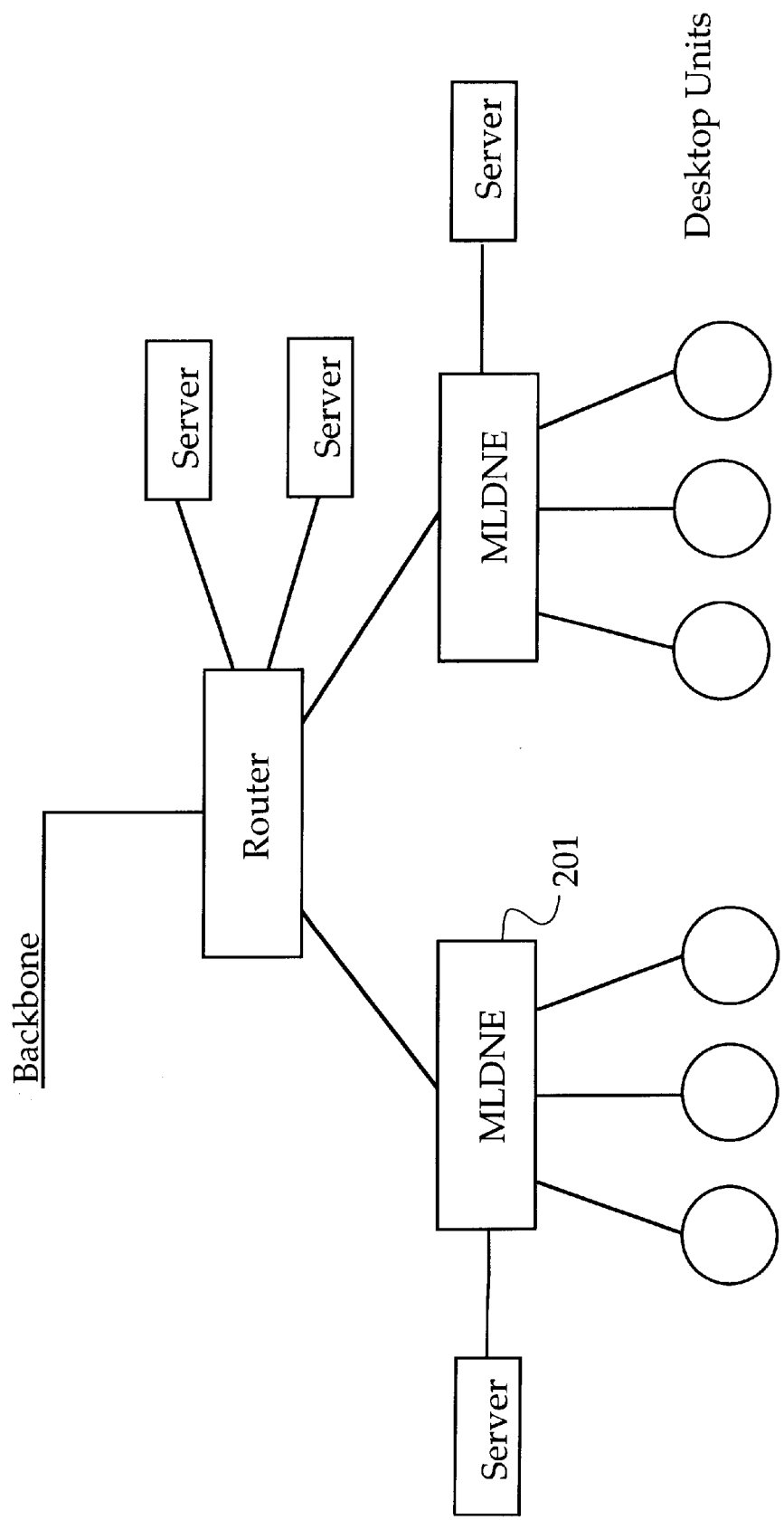
FIG. 1 is high level view of an exemplary network application of a multi-layer distributed network element (MLDNE) of the invention.

As shown in the drawings by way of illustration, the invention helps define a device that can be used to interconnect a number of nodes and endstations in a variety of different ways. For example, an application of MLDNE would be switching packets over a homogenous data link layer such as the IEEE 802.3 standard, also known as an Ethernet link. FIG. 1 illustrates the invention's use in a network where the MLDNE system is coupling a router and a number of different endstations, depicted as servers and desktop units, through external connections. The MLDNE system is capable of providing a high performance communication path between servers and desktop units as well as communications via conventional router or bridge. Thus, the invention's MLDNE is a multi-purpose network element.

In a preferred embodiment, the invention's distributed architecture is designed to handle message traffic in accordance with the Internet suite of protocols, more specifically TCP and IP (Layers 4 and 3, respectively) over the Ethernet LAN standard and MAC data link layer. However, one skilled in the art will recognize that other particular structures and methods to implement the invention's architecture can be developed using other protocols.

The invention's MLDNE has network element functions that are distributed, i.e., different parts of a function are performed by different MLDNE subsystems. These network element functions include forwarding, learning, queuing, and buffering. As will be appreciated from the discussion below and FIG. 2, MLDNE has a scalable architecture which allows for easily increasing the number of subsystems 210 as a way of increasing the number of external connections, thereby allowing greater flexibility in defining the surrounding network environment.

Figure 2:
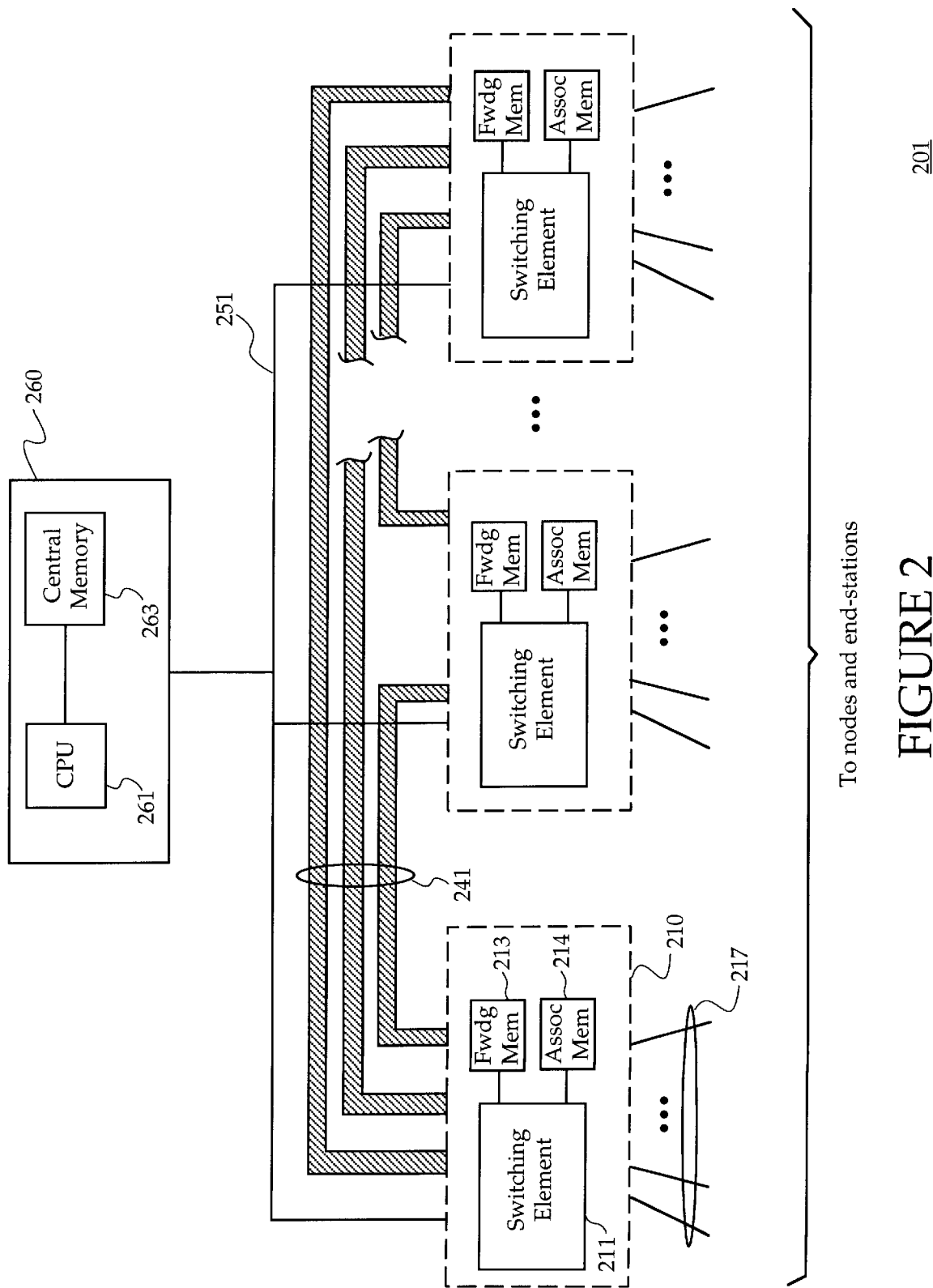
FIG. 2 illustrates a block diagram of the MLDNE system according to an embodiment of the invention.

An embodiment of the MLDNE 201 is illustrated in block diagram form in FIG. 2. A number of MLDNE subsystems 210 are fully meshed and interconnected using a number of internal links 241 to create a larger network element. Each MLDNE subsystem 210 is preferably defined to be the largest non-blocking switching unit that is cost effective to produce with modern integrated circuit manufacturing techniques.

Figure 3:
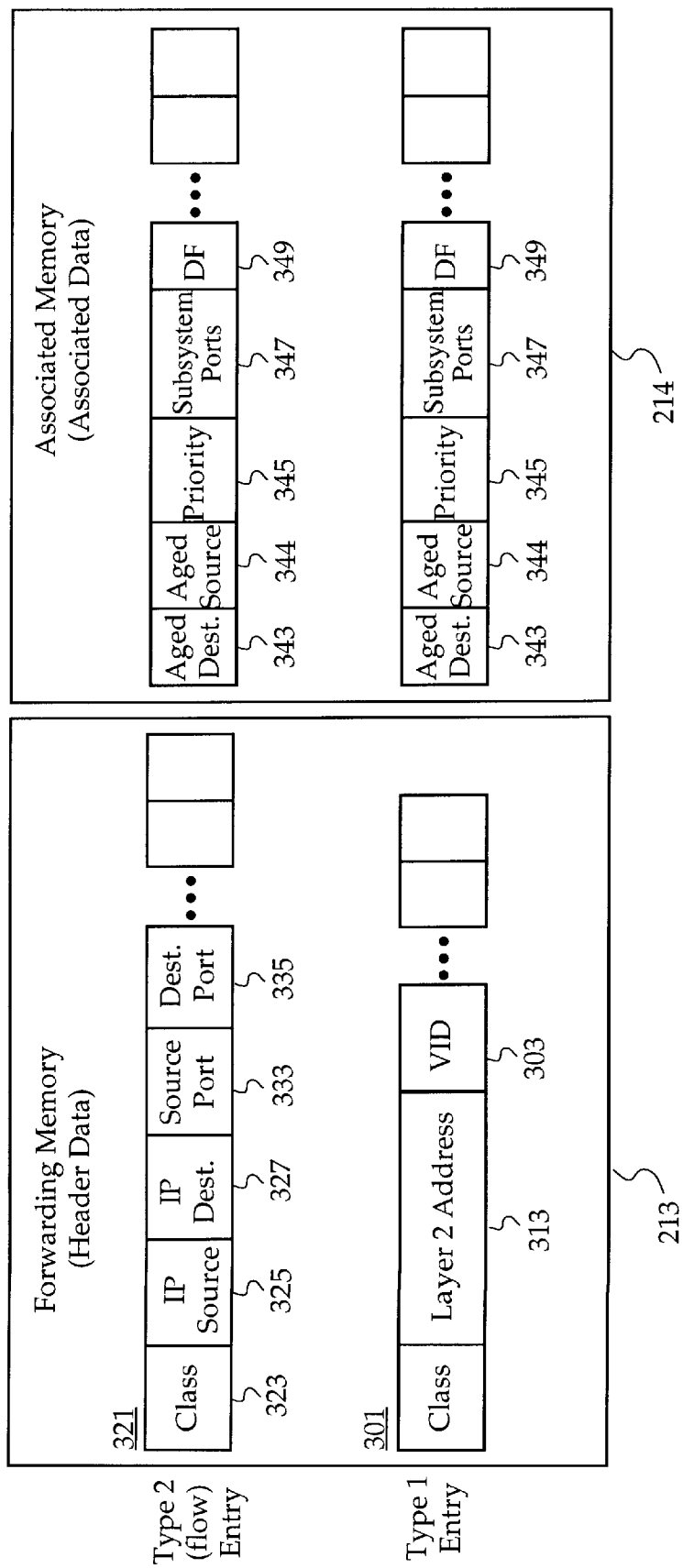
FIG. 3 illustrates exemplary forms of the entries in the forwarding and associated memories of a MLDNE subsystem in accordance with another embodiment of the invention.

Each MLDNE subsystem 210 includes a forwarding memory 213 which will include selected header data arranged as type 2 and type 1 entries used to match with the header portion of packets received by the subsystem 210, as shown in FIG. 3. In the preferred embodiment shown in FIG. 3, type 2 entries 321 include Layer 3 and Layer 4 information, whereas the type 1 entries 301 includes Layer 2 information. The forwarding memory 213 is preferably implemented as a content addressable memory (CAM) which indexes the associated memory being a random access memory (RAM). Of course, the forwarding memories 213 and/or the associated memories in the different subsystems may be implemented as a single hardware structure. A number of external ports (not shown) interfacing external connections 217 are used to connect with nodes and end-stations outside MLDNE 201 such as those shown in FIG. 1, i.e., desktops, servers, and packet switching elements such as bridges and routers. Internal ports in the MLDNE subsystem couple the internal links, where any two subsystems share at least one internal link.

In its preferred embodiment, the external and internal ports lie within the switching element 211. The MLDNE 201 also includes a central processing system (CPS) 260 that is coupled to the individual subsystems 210, through a communication bus 251 such as a Peripheral Components Interconnect (PCI) bus. The communication between the CPS and the individual subsystems need not be as fast or reliable as the internal links between subsystems, because, as appreciated below, the CPS is not normally relied upon to forward the majority of traffic through the MLDNE. Rather, the CPS normally serves to add entries and associated data to the forwarding and associated memories, respectively.

The CPS 260 includes a central processing unit (CPU) 261 coupled to a CM 263 and other memory (not shown). CM 263 includes a copy of the entries contained in the individual forwarding memories 213 of the various subsystems. The CPS has a direct control and communication interface to each MLDNE subsystem 210. However, the role of the CPS 260 in packet processing includes setting up data path resources such as packet buffers inside each subsystem, entering and managing type 2 entries in the forwarding memories, and some other special cases such as routing with options which cannot be routinely handled by and between the subsystems.

Although the CM 263 will contain a copy of the data in the individual forwarding memories, the performance requirements for the CM are less stringent than those for the individual forwarding memories, because the CPS and CM need not be designed to forward the packets at the speeds obtainable by the hardwired switching logic in each subsystem.

The internal links 241 may be configured to operate at a higher speed than some of the external connections 217, although some external connections may also be configured as high speed links, if, for example, desired to connect with a server. The internal links 241 used to interconnect the individual subsystems are designed to carry copies of packets to be forwarded, and notification signals that assist an individual subsystem in either completing a forwarding action, enabling a route, setting priorities in an output queue, and enhancing Layer 2 conversations within a subnet with Layer 3 handling directives.

For greater processing speed, each switching element 211 is preferably implemented an application specification integrated circuit (ASIC) that performs most of the below described functions of the subsystem. The multi-layer functions operate on packets that are received by the subsystem 210 through either an external port in the switching element connected to an external connection 217, or through an internal port connected to an internal link 241.

As will be understood in light of the discussion below, each network element subsystem 210 is configured to direct incoming packets to one or more internal or external ports of the switching element. If a packet matches an entry in the forwarding memory and can be forwarded, i.e., traverse the MLDNE 201, without having to go through a different subsystem (based on an entry in the forwarding memory that matches the packet's header and that has associated data in the associated memory), then the packet will not be sent to any of the internal links 241. In that situation, the associated memory 214 identifies only an external port for forwarding the packet.

On the other hand, if the associated data for the matching entry indicates that the destination of the packet is reached via an internal port, then the packet is sent to another subsystem over the internal link 241 that connects with the identified input port. If the packet headers do not match any entry in the forwarding memory, then the packet is "flooded" on all internal and external ports of the inbound subsystem. The CPS in a sense teaches each subsystem to make such forwarding decisions in the subsystem's own hardware based on multi-layer header information in the forwarding and associated memories, in order to improve forwarding speed. Given the fully meshed interconnection between the network element subsystems, where at least one separate internal link directly connects any two subsystems, it can be seen that a packet may be received and forwarded through MLDNE 201 by traversing at most two subsystems.

Learning

The conventional source address learning capability of network elements such as bridges has been distributed among the various subsystems of the MLDNE 201. Since the distributed topology inside MLDNE 201 is known to the CPS 260, the conventional Layer 2 learning function is confined to each subsystem 210. In other words, the source address of a received packet is learned only by the inbound subsystem.

This unique learning function capability is also facilitated by defining the subsystem 210 to exhibit different behavior with respect to its internal ports than its external ports. The individual subsystems are configured to know that packets arriving by an internal link should be treated differently than those arriving by an external port. For example, there is no learning of Layer 2 source addresses for packets coming in by an internal port, because the packet's source address has already been learned by another subsystem (the inbound subsystem). Also, the internal ports do not participate in the Spanning Tree Protocol.

When a new source address is being learned by a subsystem, the CPS is notified which in turn will update the CM with the new source address and the identity of the notifying subsystem. This will indicate to the CPS that the endstation or node assigned to that Layer 2 address can be reached through the notifying subsystem.

The MLDNE can also be configured to detect Layer 2 topology changes. When an endstation having a fixed Layer 2 address, which address has been learned by MLDNE, is logically or physically moved from one external connection of the MLDNE to another, then the older learned entry must somehow be identified and removed from the forwarding memory. In the event a MAC address (connected to an external connection) is logically or physically moved from one subsystem to another, the CPS, after being notified of the new location, removes the old entry.

Forwarding

The above described learning behavior with respect to the internal and external ports of the subsystem 210 provides for loop free forwarding through each subsystem, as packets arriving by internal ports are only forwarded through external ports and not to the other internal ports of the same subsystem nor to the CPS. Also, the requirement that the subsystem not learn source addresses from its internal ports does not adversely affect the forwarding operation, because the CPS 260 is configured to control inter-subsystem transfer of packets using its global view of the individual forwarding memories 213 that are combined in the CM 263.

With forwarding based on either the type 1 entry (including for the present embodiment MAC destination address of a packet) or a search of the type 2 entries, each subsystem 210 will attempt to identify the information needed to forward the packet using its forwarding memory 213 and associated memory 214. However, when a packet arrives at a subsystem, both type 1 and type 2 matching cycles are normally started, where the two operations are, in general, independent. Header matching hardware in the switching element 211 will return a result that indicates how the packet is to be forwarded (using either a matching type 1 entry or a matching type 2 entry). The result will be a function of one or more of the following: the received headers, the port of arrival, the entries in the forwarding memory, and additional Layer 3 and Layer 4 flow specific attributes such as priority and forwarding constraints programmed by the CPS.

Forwarding and Associated Memories

Having discussed forwarding and learning generally in the distributed architecture of MLDNE 201, a closer look is now taken at the role of the forwarding and associated memories in conjunction with exemplary entries illustrated in FIG. 3. The forwarding and associated memories are configured to associate forwarding information in the associated memory with a combination Layer 2, Layer 3 and Layer 4 fields of an entry in the forwarding memory. A type 2 entry 321 will normally include a header class field 323 and an address dependent portion including, for example, Internet Protocol (IP) source and destination addresses 325 and 327, respectively, and Transmission Control Protocol (TCP) source and destination ports 333 and 335, respectively. The header class will identify the type of entry, and is produced by a programmable address independent class filter in each subsystem switching element in response to receiving a packet. The header class eliminates false matches between classes that make different use of the same forwarding memory fields, and distinguishes entries based on address independent parameters.

The forwarding memory 213 of each subsystem 210 contains the following entries:

All learned Layer 2 source addresses of packets that arrive into the MLDNE 201 through external connections 217, depicted by the type 1 entry 301.

Layer 2 "destination" addresses for matching with the destination addresses of packets that arrive at the MLDNE 201 through one of the external connections 217 and are to be forwarded through an external port in another subsystem, also depicted by the Layer 2 entry 301. In contrast with the learned Layer 2 entries, these are entered in response to commands from and decisions made by the CPS. These Layer 2 "destination" address entries may be either unicast or multicast as configured by the CPS.

Header class and address-dependent Layer 3 and Layer 4 header portions for flows that arrive at MLDNE 201 through one of the external connections 117, depicted by the Layer 3 entry 321. Membership of a packet in a flow is determined by the CPS, as discussed further below.

Each entry in the forwarding memory 213 is associated with an entry in the associated memory 214. Whenever there is a match with an entry in the forwarding memory, a pointer to an entry in the associated memory 214 allows the switching element to obtain forwarding information such as the external or internal port for forwarding the packet. An entry in the associated memory includes one or more of the following fields:

Subsystem Ports fields—a field containing the ports of the subsystem through which the received packet must be forwarded. For a learned type 1 entry 301, the field 347 identifies the external port of arrival, whereas for type 1 entries created by the CPS, the field 347 identifies one or more internal and external ports. Similarly, the subsystem port field 347 can include both internal and external ports when used as associated data for a type 2 entry 321.

Priority field 345—a field used for priority tagging and priority queuing of packets. The information passed between subsystems over the internal links 241 may include such a set of priority bits with each packet that is sent. In a distributed flow, this priority information may be obtained directly from the associated memory of the outbound subsystem for queuing the packet.

Aged Source field 344—1 bit is used by the CPS to determine whether the corresponding entry should be removed because the entry is stale. When used with a learned type 1 entry 301, the bit is generally used to implement IEEE 802.1d address aging.

Aged Destination field 343—1 bit is used by the CPS to determine those type 1 or type 2 entries (including flows) which have been active recently in the address table, and those which are stale and should be removed. Also, where two subsystems are coupled by more than one internal link, the bit may be used to assist load balancing. The subsystem is used to update the age field of the flow entry (the Aged Destination field 343 in the associated memory 214) upon each match of the flow entry in order to assist the CPS in aging the entry.

Distributed Flow field 349—This single bit is passed from an inbound subsystem 210 to an outbound subsystem over the internal links 241 in order to control the type of matching cycle (type 1 or type 2) used in the outbound subsystem. In normal use, the bit will be configured to indicate that a type 1 cycle be used in the outbound subsystem.

The type 1 entries and their associated data in the forwarding and associated memories 213 and 214 are entered as follows.

Some of the type 1 entries 301 and their associated data are normally learned automatically by the subsystem 210 without any intervention by the CPS 260. However, the MLDNE can be configured to optionally allow the CPS to authorize such changes to the forwarding and associated memories.

The learned type 1 entry 301 has subsystem ports field 347 and age fields 344 in the associated memory 214 that specify the external port of arrival of the packet, and whether the entry 301 has matched the headers of a recently received packet.

Similarly, the type 1 "destination" entries 301 and their associated data which have been created by the CPS have a format that is identical to the learned entry 301. The type 1 "destination" address field 313 is filled by CPS 260 from its CM 263 in response to receiving a "miss" notification from the inbound subsystem 210. The miss notification occurred because the header portion, including Layer 2 destination address of the received packet (arriving at an external port) did not match any type 1 entry in the forwarding memory.

A received packet whose destination is not known by the subsystem 210, i.e., no header match with a type 1 entry 301 in the forwarding memory 213, is flooded to all internal ports, all external ports other than the port of arrival, and the CPS 260. Such a flooding action by the subsystem will continue each time a packet having an unknown Layer 2 destination address is received until either the CPS 260 programs a matching "destination" entry 301 in the forwarding memory 213, or the destination address is learned by the subsystem as a source address 303 in response to receiving a packet at an external port.

An Example of Distributed Forwarding

Figure 4:
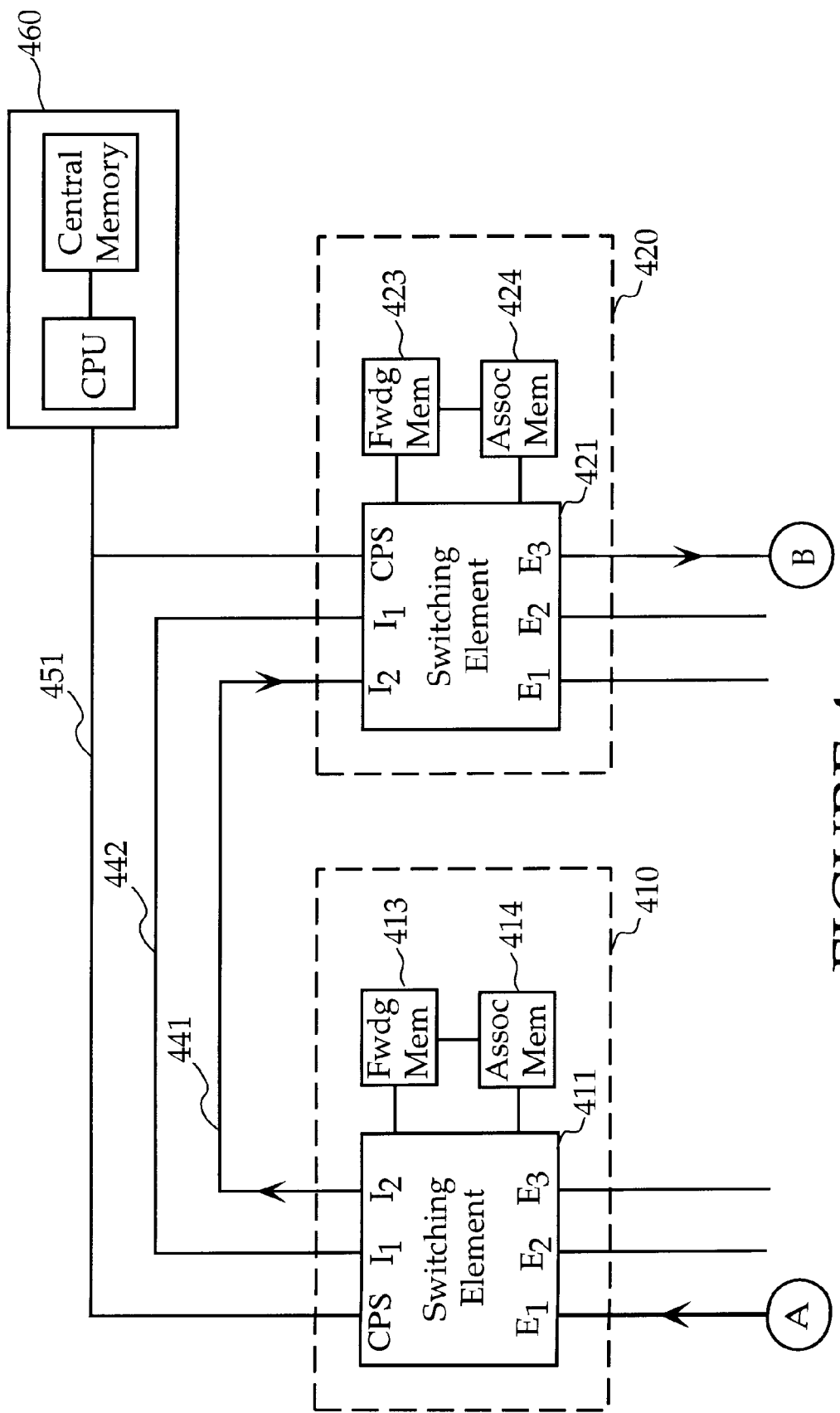
FIG. 4 is a block diagram of an embodiment of the MLDNE having only two subsystems.

The Layer 2 distributed forwarding aspects of the invention will now be described in further detail and by way of example, for an MLDNE 201 having only two subsystems 410 and 420 as shown in FIG. 4.

When a first packet is received by the inbound subsystem 410 from a node or endstation A through external port $E_1$, the learning operation occurs if the packet's Layer 2 source address is unknown, or the source address exists in an entry that has associated with it a different port than the port of arrival. The CPS 460 is notified of this newly learned header entry which is duplicated in the CM as a Layer 2 address and the corresponding subsystem through which the packet arrived into the MLDNE.

If there is a match between the first packet's header, including destination address, and a type 1 entry 301, then the packet is forwarded through the port identified in the associated memory 414. If the identified port is the port of arrival ($E_1$), the first packet is simply discarded or ignored.

If, on the other hand, there is no match between the packet's destination address and a type 1 entry 301, then the packet is flooded on all ports of subsystem 410, including CPS, $E_2$, $E_3$ (but not $E_1$), and $I_1$ or $I_2$. The CPS is notified of this miss and receives the first packet's headers. Also, the hardware flooding occurs independently of the CPS being notified because of the separate bus 451 used to communicate with the CPS 460.

The CPS 460 in response to receiving notice of the first packet's miss in subsystem 410 checks the CM for a Layer 2 address that matches the Layer 2 destination address of the first packet. The CM has a copy of the Layer 2 header data inducing address 313 of the type 1 entries 301 in each of the forwarding memories 413 and 423, together with information that identifies the particular subsystem that contains each forwarding memory. Thus, the CPS has knowledge of all Layer 2 source addresses that are learned by the subsystems.

If a Layer 2 address in the CM matches the Layer 2 destination address of the first packet, then the CPS copies the matched Layer 2 address from the CM into the forwarding memory 413 as a new type 1 "destination" entry 301. Also, the CPS identifies the subsystem port field 317 in the new entry as $I_1$ or $I_2$ as the port that links the subsystem 420. In this two subsystem example, the matching Layer 2 address in the CM must have been previously learned by subsystem 420, because the address was not found in the forwarding memory 413 of the inbound subsystems 410. Assuming the first packet's destination was B, then subsequent packets arriving at the MLDNE via subsystem 410 and destined to B would be forwarded in hardware over the internal link 441 or 442.

Assume now that a second packet arrives at subsystem 410 but this time via an internal link 441 or 442. The second packet was sent by another subsystem, subsystem 420 for this example. No learning occurs in subsystem 410 for the second packet because the second packet arrived through an internal link. If there is a type 1 match of the second packet's header (including Layer 2 destination address) with a type 1 entry 301 in the forwarding memory 413, then the second packet is forwarded via the external port identified in the associated memory 414. Note that the second packet is forwarded only on an external port, because the packet arrived by an internal link.

If there is no match with a type 1 entry 301, then the second packet is flooded to all external ports, and not any internal ports, of the subsystem 410. The CPS is not notified of this 'miss' because the packet arrived by an internal link.

The above discussion of the invention therefore illustrates how the type 1 entries 301 and their associated data are filled in the forwarding and associated memories.

Flows

The above discussion highlighted the forwarding capabilities of the MLDNE 201 in the type 1 (Layer 2) framework. The distributed architecture of the invention, however, also supports forwarding based on a second type of entry that, for the present embodiment, includes the Layer 3 and Layer 4 information. In particular, another embodiment of the invention enables a network element to forward a series of related packets based on the end-to-end information in their Layer 3 and Layer 4 headers.

Flows are defined as conversations between endstations in the same subnet that enjoy Layer 3 and Layer 4 functionalities as programmed into and supported by the MLDNE 201 and the operating endstations. Flows are thus sequences of packets transferred between fixed Layer 3 end stations that have uniform and well defined service requirements. One of the objectives of MLDNE 201 is to switch such sequences in hardware (with bridge-like speed) yet allow path (routing) and class of service control.

When a flow is confined to a subnet (defined logically or physically), no routing protocols will be needed to forward the flow packet to its destination. The subnet, of course, has been predefined by configuring the relevant subsystems in the MLDNE 201 to recognize that a group of external connections are defined as a single subnet. The subnet can also traverse multiple subsystems to logically define a Virtual LAN (VLAN). The VLAN enhancements to the MLDNE are discussed in a section below.

A hardware mechanism such as a class filter implemented in each switching element can be programmed to identify potential packets as members of a flow based on plain traffic observation (no application or end station changes), or using RSVP type signaling according to techniques known in the art. Exemplary packet classes that can be targeted for flows include TCP and UDP non-fragmented packets. The class filter in each subsystem is programmed to initiate a type 2 matching cycle search upon receiving such packets.

Once identified as a potential flow candidate by the class filter, a type 2 search of the forwarding memory 213 is conducted to find a matching type 2 entry 321. If there is no such matching entry, then the packet or its header alone is sent to the CPS 260 in response to which the CPS will determine whether or not to install a type 2 entry in the forwarding memory 213. The network element's preconfigured policy, in the class filter and in the CPS decision-making, thus determines whether the headers, the entire packet, or nothing, are sent to the CPS. This is configurable per entry in the forwarding memory, and per class in the class filter.

The type 2 entry 321 created in the inbound subsystem by the CPS will have a header class field 321 that identifies the entry as a type of flow, in addition to header data, including, for example, the IP source and destination address fields 325 and 327, that defines a desired level of granularity for including future packets in the flow.

A subsequent received packet which matches the class of a flow entry and matches the type 2 entry itself (based on information in its headers, such as Protocol Version, Protocol, Network Layer Source and Destination, Application Source and Destination Ports) will generally be forwarded, but will also enjoy QOS treatment as specified in the associated data of the matching type 2 entry The QOS information will be passed over the internal link if the outbound subsystem is different than the inbound subsystem. For example, the TCP source and destination port information in the received packet's header can be used to distinguish between two transport protocol clients that wish to communicate at different priority levels. The MLDNE can process such packets based on the QOS information found in the upper layer (Layers 3 and 4) headers of each packet, and also assign multiple type 2 entries to sequences of packets between the same endstations.

If no matching type 2 entry exists in the forwarding memory of the inbound subsystem following a type 2 matching cycle, the packet may be either bridged at Layer 2 with no quality of service mapping, bridged at Layer 2 with quality of service specified as the default for its class, or given to the CPS for forwarding based on software in the CPS 260. Such default behavior is programmable for every packet class in the MLDNE 201.

Distributed Flows

Handling flows in the invention's MLDNE may be done in a distributed fashion as discussed below. Once a new packet has been identified as a potential flow candidate by the class filter, the CPS is given the headers of the packet to decide whether or not to set up a flow entry. As determined by the CPS, the subsystem port field 347 of the flow entry if one is created will reflect the proper internal or external forwarding ports of the subsystem that lead to Layer 3 destination.

If the Layer 3 destination is to be reached through a subsystem other than the inbound one, then the CPS can be instructed to make a type 2 entry in the separate outbound subsystem (in addition to the type 2 entry in the inbound subsystem) that enables receiver heterogeneity. For that scenario, the CPS sets a distributed flow (DF) bit 349 associated with the type 2 entry in the inbound subsystem. The DF bit will be passed to the outbound subsystem over the internal links when a new packet matches the type 2 entry of the inbound subsystem. The DF bit being set forces a type 2 search to be performed by the separate outbound subsystem. The associated data for the matching type 2 entry in the outbound subsystem will normally reflect the quality of service for the flow, such as in the queuing priority field 345, that overrides any QOS received over the internal link with the packet.

When a subsequent packet that matches the flow is received by the inbound subsystem, the packet is forwarded via the ports specified in the flow entry's associated data. If the port is an internal port, then the DF bit is also sent across the internal link 241 in addition to the packet. The outbound subsystem receives the packet, recognizes the DF bit being set on the internal link, and in response attempts to match the packet with a type 2 entry in its own forwarding memory, which entry had been previously created by the CPS as discussed above. The class to be used for this type 2 search is determined by the header matching capability of the outbound subsystem. The matching type 2 entry in the outbound subsystem 220 will exist and should not rely on a type 1 result, i.e., no type 2 matching cycle miss. The packet is then forwarded to the Layer 3 destination of the packet through the external port of the outbound subsystem identified in the associated data of the matching type 2 entry.

The MLDNE can be also be configured to support packets having a multicast destination address where the type 2 entry in the outbound subsystem specifies a multicast destination address, associated with one or more external ports identified in the associated memory to be used for forwarding copies of the packet. Also, the distributed flow construct of the invention allows receiver heterogeneity to be supported for multicast packets. The type 2 entry points to associated data that includes a force_be bit for each external port. This bit permits a packet to be queued with lowest priority in the corresponding external port, without affecting service characteristics of any other external ports. The bits are set by the CPS in the associated memory of the separate outbound subsystem, corresponding to each type 2 entry 321.

Alternatively, the MLDNE entries can be configured to support homogenous receiver priority based on decisions made in the inbound subsystem. The QOS information, such as priority field 345 for queuing a flow packet in the external ports of the outbound subsystem, is normally passed from the inbound subsystem over the internal links to the outbound subsystem. However, as indicated above, the DF construct permits the CPS to configure a type 2 entry in the outbound subsystem to override the priority that was delivered over the internal link with the packet.

VLANs

Another embodiment of the MLDNE supports LAN bridging functions to endstations in a location independent fashion, using, for example, the virtual LAN concept defined in IEEE 802.1Q for 802.3 and Ethernet packets. Packets sent by endstations that support such VLANs will have Layer 2 headers that are "tagged" with a VLAN identification (VID) field.

The MLDNE when so configured will also use such VLAN tags in communicating on its internal links and appropriate external connections. Each external port may be assigned a VID which will be used to tag any untagged packets that are received. The packet's VID identifies the broadcast domain of the packet. A VLAN-enabled MLDNE will be instructed on how to forward packets that are broadcast or having unknown Layer 2 destination addresses on a per VLAN basis. When the forwarding memory of a VLAN-enabled MLDNE is implemented using a mask per bit content addressable memory (CAM), one entry for each supported VLAN should be added to the forwarding memory that will match all broadcast packets and unknown unicast packets for a given VLAN. Such a match will occur if the Layer 2 address field 313 of the entry 301 is wildcarded. The matching entry will specify a VID, while the associated data will identify the ports which define the VLAN, so that a packet with an unknown Layer 2 destination will be flooded only to its broadcast domain, i.e., the VLAN specified in the packet.

VLAN capability can be disabled in the MLDNE by either wildcarding the VID field 303 in all type 1 entries 301 in the forwarding memory, or by setting a constant and identical value for the VID field 303 in all entries and configuring all external ports to tag all incoming packets with the constant value.

To summarize, the distributed scheme in the MLDNE 201 provides a scalable architecture where the number of external connections can be easily increased by adding additional subsystems. More importantly, the forwarding memory 213, a high performance but costly hardwired logic circuit in each subsystem, need not be significantly expanded to provide additional entries as the number of external connections are increased. Because each subsystem uses the forwarding memory only to store information related to its own external and internal connections, the size of the forwarding memory can be predefined at the time MLDNE subsystem is manufactured. As the dominant factor in defining the depth of the forwarding memory 213 is the number of MAC addresses directly connected to the external link of connections 217, increasing the number of subsystems used in the MLDNE 201 will only slightly affect the storage requirements of each individual forwarding memory.

The embodiments of the MLDNE described above for exemplary purposes are, of course, subject to other variations in structure and implementation within the capabilities of one reasonably skilled in the art. Thus, the details above should be interpreted as illustrative and not in a limiting sense.

What is claimed is:

1. In a network element for receiving and forwarding packets between nodes, the network element having separate first and second subsystem circuitry coupled by an internal link, the subsystems having first and second forwarding memories, respectively, a method for relaying packets comprising the steps of:

receiving a packet by the first subsystem circuitry the packet having a first header portion including a destination address;

searching the first forwarding memory for a first entry that matches the destination address in the first header portion;

sending the packet to the second subsystem circuitry through the internal link in response to the first entry matching the destination address in the first header portion and without changing the destination address of the packet;

and forwarding the packet to a destination specified in the first header portion in response to the first header portion including the destination address matching a second entry in the second forwarding memory.

2. A method as in claim 1 wherein the destination address is a Layer 2 destination address.

3. A method as in claim 1 wherein the first entry comprises a Layer 2 address that was learned by the second subsystem and copied to the first forwarding memory prior to the packet being received by the first subsystem.

4. A method as in claim 1 wherein the second entry comprises a Layer 2 address that was learned by the second subsystem prior to the packet being received by the first subsystem.

5. In a network element for receiving and forwarding packets between nodes, the network element having first and second subsystems coupled by an internal link, the subsystems having first and second forwarding memories, respectively, a method for relaying packets comprising the steps of:

receiving a packet by the first subsystem, the packet having a second header portion, the second header portion including a network layer destination address;

searching the first forward memory for a type 2 entry that matches the second header portion;

sending the packet and a control signal to the second subsystem through the internal link in response to the type 2 entry matching the first header portion, the control signal being associated with the type 2 entry and defining a queuing priority; and forwarding the packet from the second subsystem, according to said queuing priority set by the control signal, to a destination specified in the second header portion.

6. A method as in claim 5 wherein the step of sending the packet and a control signal further includes sending a second control signal which identifies the packet as a member of a flow to the second subsystem, and further comprising the step of searching the second forwarding memory for a type 2 entry that matches the second header portion in response to receiving the second control signal.

7. A network element for interconnecting nodes, comprising:

first subsystem circuitry having a first forwarding memory and configured to search the first forwarding memory for a first entry that matches a destination address in a first header portion of a packet;

second subsystem circuitry separate from the first subsystem circuitry and having a second forwarding memory; and an internal link coupling the first and second subsystems for passing packets and control information from the first subsystem circuitry to the second subsystem circuitry, wherein the first subsystem circuitry is configured to send the packet to the second subsystem circuitry through the internal link in response to the first entry matching the first header portion including the destination address, and without changing a Layer 2 destination address of the packet, and wherein the second subsystem circuitry is configured to forward the packet to a destination specified in the first header portion in response to a second entry in the second forwarding memory matching the destination address in the first header portion of the packet.

8. A network element as in claim 7 wherein
the destination address is a Layer 2 destination address.

9. A network element as in claim 7 wherein
the first entry comprises a Layer 2 address that was learned by the second subsystem and copied to the first entry prior to the packet being received by the first subsystem.

10. A network element as in claim 9 wherein
the second entry comprises a Layer 2 address that was learned by the second subsystem prior to the packet being received by the first subsystem.

11. A network element as in claim 7 further comprising
a central processing system (CPS) having a central memory (CM), the CPS coupled to each subsystem and configured to cause a source address learned by the second subsystem to be stored in an entry of the first forwarding memory in response to finding a copy of the source address in the central memory.

12. A network element as in claim 7 wherein
the first subsystem further comprises
a first associated memory and an internal port coupling the internal link, the first associated memory for storing a port value identifying the internal port, the first subsystem configured to associate the port value with the first entry in the forwarding memory.

13. A network element as in claim 7 wherein
the first subsystem is further configured to flood the packet to a predefined subnet in response to no entry in the first forwarding memory matching the destination address in the first header portion.

14. A network element as in claim 7 wherein
the first subsystem is further configured to send the packet to the second subsystem in response to a second entry in the first forwarding memory matching a second header portion of the packet, the second header portion comprising a network layer destination address separate from the destination address in the first portion header, and wherein
the second subsystem is further configured to forward the packet to a destination specified in the second header portion.

15. A network element as in claim 14 wherein
the second subsystem is further configured to forward the packet to a destination specified in the second header portion in response to a fourth entry in the second forwarding memory matching the second header portion of the packet.

16. A network element as in claim 14 wherein
the third subsystem is further configured to perform a search of the second forwarding memory for an entry matching the second header portion of the packet in response to receiving the packet and a first control signal from the first subsystem.

17. A network element as in claim 14 wherein
the second subsystem is configured to forward the packet in accordance with quality of service (QOS) information received from the first subsystem, the QOS information being associated with the third entry in the first subsystem.

18. A network element as in claim 15 wherein the second subsystem is further configured to associate second QOS information with the fourth entry, the second QOS information overriding QOS information received from the first subsystem.

19. A network element as in claim 7 further comprising
a central processing system (CPS) having a central memory (CM), the CPS coupled to each subsystem and configured with a copy of all source addresses learned by the first and second subsystems, and configured to cause a source address learned by the second subsystem to be stored in an entry of the first forwarding memory in response to a notification from the first subsystem that a destination address of a packet does not match any entry in the first forwarding memory but matches said source address.

20. A method as in claim 5 wherein the network element further comprises:
a central processing system (CPS) having a central memory (CM), the CPS coupled to each subsystem and configured with a copy of all source addressed learned by the first and second subsystems, and configured to cause a source address learned by the second subsystem to be stored in an entry of the first forwarding memory in response to a notification from the first subsystem that a destination address of a packet does not match any entry in the first forwarding memory but matches said source address.

21. A method as in claim 6 wherein a flow priority is associated with the type 2 entry in the second subsystem, and wherein the step of forwarding the packet from the second subsystem is in response to the type 2 entry matching the second header portion, the packet being forwarded from the second subsystem according to the flow priority rather than the queuing priority.

22. A network element as in claim 7 wherein each subsystem has a plurality of external ports and at least one internal port, the internal port connects to the internal link and the external ports connect to other nodes, and wherein the packet arriving through one of the external ports in the first subsystem and whose destination address in the first header portion does not match any entry in the first forwarding memory is flooded to all of the external ports, except the port of arrival, and the at least one internal port.

23. A network element as in claim 7 wherein each subsystem is implemented as part of a separate IC.

24. A network element for interconnecting nodes, comprising:
first subsystem having a first forwarding memory and configured to search the first forwarding memory for a first entry that matches a first header portion of a packet;
second subsystem having a second forwarding memory;
an internal link coupling the first and second subsystems for passing packets and control information from the first subsystem to the second subsystem; and
a central processing system (CPS) having a central memory (CM), the CPS coupled to each subsystem and configured to cause a source address learned by the second subsystem to be stored in an entry of the first forwarding memory in response to finding a copy of the source address in the central memory, and wherein
the first subsystem is configured to send the packet to the second subsystem through the internal link in response to the first entry matching the first header portion, and the second subsystem is configured to forward the packet to a destination specified in the first header portion.

25. A network element for interconnecting nodes, comprising:
first subsystem having a first forwarding memory and configured to search the first forwarding memory for at least one of a first entry that matches a first header portion of a packet and a third entry that matches a second header portion of the packet, the second header portion comprising a network layer destination address;

second subsystem having a second forwarding memory; and an internal link coupling the first and second subsystems for passing packets and control information from the first subsystem to the second subsystem, wherein
the first subsystem is configured to send the packet to the second subsystem through the internal link in response to the first entry matching the first header portion, the second subsystem is configured to forward the packet to at least one of a destination specified in the first header portion, and a destination specified in the second header portion, and wherein the second subsystem is further configured to perform a search of the second forwarding memory for an entry matching the second header portion of the packet in response to receiving the packet and a first control signal from the first subsystem.

* * * * *